United States Patent
Rao

(10) Patent No.: US 11,899,095 B2
(45) Date of Patent: Feb. 13, 2024

(54) DOPPLER PROCESSING IN FREQUENCY-MODULATED CONTINUOUS WAVE RADAR SYSTEMS USING DITHER

(71) Applicant: TEXAS INSTRUMENTS INCORPORATED, Dallas, TX (US)

(72) Inventor: Sandeep Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 291 days.

(21) Appl. No.: 17/132,462

(22) Filed: Dec. 23, 2020

(65) Prior Publication Data

US 2022/0082681 A1    Mar. 17, 2022

(30) Foreign Application Priority Data

Sep. 17, 2020 (IN) ............................. 202041040230

(51) Int. Cl.
*G01S 13/58* (2006.01)
*G01S 13/931* (2020.01)
(Continued)

(52) U.S. Cl.
CPC ............ *G01S 13/584* (2013.01); *G01S 7/352* (2013.01); *G01S 13/34* (2013.01); *G01S 13/931* (2013.01)

(58) Field of Classification Search
CPC ........ G01S 13/584; G01S 7/352; G01S 13/34; G01S 13/931
(Continued)

(56) References Cited

U.S. PATENT DOCUMENTS 7,611,467 B2 * 11/2009 Zhang .................... A61B 8/06
                                                    600/455
7,843,381 B2 * 11/2010 Matsuoka ............... G01S 13/18
                                                    342/132

(Continued)

FOREIGN PATENT DOCUMENTS

CN        104849708 A      8/2015
EP         2884299 A1 *    6/2015    ............. G01S 13/18
(Continued)

OTHER PUBLICATIONS

International Search Report and Written Opinion for International Patent Application No. PCT/US 2021/05003, dated Nov. 18, 2021, 8 pages.
(Continued)

*Primary Examiner* — Nuzhat Pervin
(74) *Attorney, Agent, or Firm* — Michael T. Gabrik; Frank D. Cimino

(57) ABSTRACT

Systems and methods are provided for Doppler processing for frequency-modulated continuous wave (FMCW) radar systems. Range-gate data representing the position of an object within a region of interest is generated at a radar sensor. A first Doppler Fast Fourier Transform (Doppler-FFT) is performed on the range-gate data to provide a first set of Doppler-FFT data. A velocity associated with a signal amplitude that exceeds a noise floor is identified in the first set of Doppler-FFT data. A correction value for the range-gate data is determined from the identified velocity. The range-gate data is modified using the determined correction value to provide modified range-gate data. A second Doppler-FFT is performed on the modified range-gate data to provide a second set of Doppler-FFT data.

17 Claims, 4 Drawing Sheets

(51) Int. Cl.
  *G01S 7/35* (2006.01)
  *G01S 13/34* (2006.01)
(58) Field of Classification Search
  USPC .......................................................... 342/99
  See application file for complete search history.

(56) References Cited

U.S. PATENT DOCUMENTS

| | | | | |
|---|---|---|---|---|
| 9,063,213 | B2 * | 6/2015 | Himmelstoss | G01S 13/931 |
| 9,500,741 | B2 * | 11/2016 | Kishigami | G01S 7/414 |
| 9,541,637 | B2 * | 1/2017 | Searcy | H03M 7/30 |
| 9,575,170 | B2 * | 2/2017 | Kurono | G01S 13/42 |
| 10,330,773 | B2 * | 6/2019 | Rao | G01S 7/023 |
| 10,489,708 | B2 * | 11/2019 | DeTone | G06N 3/045 |
| 10,605,896 | B2 * | 3/2020 | Cao | G01S 13/50 |
| 10,921,436 | B2 * | 2/2021 | Jansen | G01S 13/583 |
| 11,035,931 | B1 * | 6/2021 | Kipp | G01S 13/935 |
| 11,119,186 | B2 * | 9/2021 | Roh | G01S 13/536 |
| 11,125,869 | B2 * | 9/2021 | Santra | G01S 13/582 |
| 11,131,761 | B2 * | 9/2021 | Rao | G01S 13/931 |
| 11,422,249 | B2 * | 8/2022 | Roger | G01S 13/584 |
| 2009/0322591 | A1 * | 12/2009 | Matsuoka | G01S 13/282 342/70 |
| 2012/0235855 | A1 * | 9/2012 | Kurtz | G01S 13/584 342/128 |
| 2013/0314268 | A1 * | 11/2013 | Fukuda | G01S 13/584 342/21 |
| 2016/0018511 | A1 * | 1/2016 | Nayyar | G01S 7/03 342/27 |
| 2016/0223665 | A1 * | 8/2016 | Winstead | G01S 13/882 |
| 2017/0343648 | A1 * | 11/2017 | Trotta | G01S 13/584 |
| 2017/0350971 | A1 * | 12/2017 | Winstead | G01S 7/354 |
| 2019/0025420 | A1 * | 1/2019 | Frick | G01S 13/589 |
| 2019/0158022 | A1 * | 5/2019 | Issakov | G01S 7/03 |
| 2019/0178985 | A1 * | 6/2019 | Roh | G01S 13/56 |
| 2019/0227156 | A1 * | 7/2019 | Santra | G01S 13/42 |
| 2020/0049812 | A1 * | 2/2020 | Jansen | G01S 13/4454 |
| 2020/0116850 | A1 * | 4/2020 | Santra | G01S 13/582 |
| 2022/0050196 | A1 * | 2/2022 | Eo | G01S 7/354 |

FOREIGN PATENT DOCUMENTS

| | | | | | |
|---|---|---|---|---|---|
| EP | 3015880 | A1 * | 5/2016 | ........... | G01S 13/227 |
| EP | 3173812 | A1 * | 5/2017 | ........... | G01S 13/343 |
| EP | 2884299 | B1 * | 2/2018 | ........... | G01S 13/18 |
| EP | 3514569 | A1 * | 7/2019 | ............ | G01S 13/42 |
| EP | 3640675 | A1 * | 4/2020 | ........... | A61B 5/0507 |

OTHER PUBLICATIONS

Rao: "Introduction to mmwave Sensing: FMCW Radars"; found on the Internet Mar. 4, 2021 at: https://training.ti.com/sites/default/files/docs/mmwaveSensing-FMCW-offlineviewing_2.pdf; pp. 1-70.

* cited by examiner

DOPPLER PROCESSING IN FREQUENCY-MODULATED CONTINUOUS WAVE RADAR SYSTEMS USING DITHER

CROSS-REFERENCE TO RELATED APPLICATION

This application claims priority to India application 202041040230, filed Sep. 17, 2020.

TECHNICAL FIELD

This invention relates to electrical systems, and more particularly, to Doppler processing for frequency-modulated continuous wave (FMCW) radar systems.

BACKGROUND

One form of distance measuring radar is based on frequency modulation, in which a frequency of a returned signal is compared to that of the transmitted signal. This technique can be used in continuous wave radar and is used, for example, in vehicle applications such as adaptive cruise control (ACC), emergency braking, pedestrian detection, and 360-degree sensing, as well as industrial applications such as building automation, people counting, and surveillance. In these systems a carrier signal is frequency modulated in a predetermined way to provide a chirp and transmitted to a region of interest. A received reflection from the region of interest can be continuously compared to the transmitted chirp using a beat frequency modulator that produces a frequency tone representing a time delay between transmission of the chirp and reception of the reflection. This can be determined from the known frequency modulation of the chirp. A distance that the reflected signal travelled, which is twice the distance of the object from which the signal had reflected from the radar system, can be determined from this time delay.

SUMMARY OF THE INVENTION

In accordance with an aspect of the present invention, a system is provided. A radar sensor module generates range-gate data representing the position of an object within a region of interest. A signal processor performs a Doppler Fast Fourier Transform (Doppler-FFT) on the range-gate data to provide Doppler-FFT data having a noise floor, identifies a velocity associated with a signal amplitude in the Doppler-FFT that exceeds the noise floor, determines a correction value for the range-gate data from the identified velocity, and modifies the range-gate data using the determined correction value to provide modified range-gate data.

In accordance with another aspect of the present invention, a method is provided. Range-gate data representing the position of an object within a region of interest is generated at a radar sensor. A first Doppler Fast Fourier Transform (Doppler-FFT) is performed on the range-gate data to provide a first set of Doppler-FFT data. A velocity associated with a signal amplitude that exceeds a noise floor is identified in the first set of Doppler-FFT data. A correction value for the range-gate data is determined from the identified velocity. The range-gate data is modified using the determined correction value to provide modified range-gate data. A second Doppler-FFT is performed on the modified range-gate data to provide a second set of Doppler-FFT data.

In accordance with yet another aspect of the present invention, a method is provided. Range-gate data representing the position of an object within a region of interest is generated at a radar sensor. A set of steps are performed iteratively until no signal amplitude in a Doppler Fast Fourier Transform (Doppler-FFT) on the range-gate data is above a threshold value. During each iteration, a Doppler-FFT is performed on the range-gate data to provide the Doppler-FFT data, and a velocity associated with a signal amplitude that exceeds a noise floor in the Doppler-FFT data is identified. A correction value is determined for the range-gate data from the identified velocity, and the range-gate data is modified using the determined correction value.

DETAILED DESCRIPTION OF THE INVENTION

One method of addressing interference between radar systems in close proximity is adding a known variability to the spacing between radar chirps, referred to as "dither." Unfortunately, the added dither increases the phase noise when comparing the phase of a signal return for a given target between two chirps during a Doppler analysis, causing each moving object in a scanned region to produce a "phase skirt" of noise. The severity of the issue increases with the strength of the signal, and a sufficiently strong signal in the Doppler analysis can raise the noise floor in a Doppler analysis above the peaks representing weaker signals. As a result, objects can be lost in the phase noise, reducing the effectiveness of the radar system.

To mitigate the effects of dither on the Doppler analysis, the systems and methods herein use a correction value calculated from a velocity associated with a strong signal peak. This correction value reduces the phase noise caused by the strong signal peak, allowing weaker signals to be detected. Accordingly, a first Doppler analysis is performed on a set of range-gate data to provide a velocity measurement for an object represented by the strong signal. A correction value is calculated from the identified velocity and applied to the range-gate data, and a second Doppler analysis is performed on the corrected range-gate data to detect any weaker signals hidden by the noise.

Figure 1:
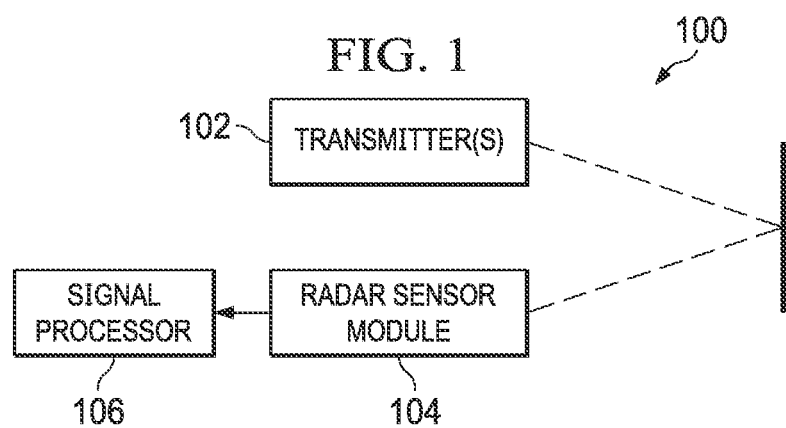
FIG. 1 illustrates a frequency-modulated continuous wave (FMCW) radar system.

FIG. 1 illustrates a frequency-modulated continuous wave (FMCW) radar system 100. The system 100 includes a transmitter 102 that transmits a FMCW electromagnetic radiation (EM) signal at a region of interest. It will be appreciated that the transmitter can include one or multiple antennas. In one implementation, the frequency-modulated continuous wave EM signal is a "chirp" signal having a frequency that increases with linearly with time, although it will be appreciated that the system 100 can utilize any appropriate signal in which the frequency varies with time in a known fashion. The transmitter 102 can provide the chirp signals in sets, referred to as frames. In one example, each frame contains sixty-four chirps, and the transmitter 102 transmits twenty frames per second.

A radar sensor module 104 receives electromagnetic radiation reflected from the region of interest for each chirp. It will be appreciated that the transmitter can include one or multiple antennas. The radar sensor module 104 generates a signal representing the received electromagnetic radiation by mixing the received signal with a signal representing the transmitted electromagnetic radiation at an analog mixer and sampling a resulting intermediate frequency (IF) signal, or beat signal, at an analog-to-digital converter (ADC) to provide a time series of IF samples for each of one or more of antennas. Via the mixing process, the transmitted FMCW signal is compared to the return signal to determine a difference in frequency between the transmitted and returned signals. The samples are provided to a signal processor 106. In one implementation, the one or more antennas are a plurality of virtual antennas, with outputs extracted via digital signal processing from the outputs of an array of physical antennas. In such a case, a time series of IF samples is generated for each of the virtual antennas. An example of a radar system using a time division multiplexed multiple input and multiple output (TDM-MIMO) implementation of a virtual antenna array can be found in TI Application Report SWRA554A, available at http://www.ti.com/lit/an/swra554a/swra554a.pdf, which is hereby incorporated by reference.

The signal processor 106 evaluates the time series of IF samples to detect objects within the region of interest. It will be appreciated that the signal processor can be implemented, for example, as a dedicated microprocessor. The signal processor provides a frequency domain representation of each time series of IF samples as values for a set of range bins representing distance from the radar sensor module 104. Since the frequency modulation pattern is known, the change in frequency between the signals at a given time, as represented by the frequency of the IF signal, can provide the time of flight for the signal, and thus the range information from which the returned signal was reflected. Accordingly, a discretized representation of the return strength over range, referred to herein as "range bin values", can be determined. Accordingly, for each chirp signal, a set of range bin values can be determined for each of the plurality of antennas.

In one implementation, the set of range bin values is determined by averaging a set of IF samples from the IF signal for the chirp to provide a DC component and subtracting the DC component from each sample to provide a set of DC-compensated samples. The DC-compensated samples are then subjected to a Fast Fourier Transform (FFT) to provide the set of range bin values. In some applications, the DC-compensation can be preceded by a windowing operation, instead of using all samples received after a given chirp. Accordingly, after a frame of chirps has been evaluated, the resulting data can be conceptualized as a two-dimensional data structure, in which each sample value represents a given chirp and range bin.

The signal processing element 106 then evaluates the frame across chirps to detect motion of any detected objects within the region of interest. To this end, the signal processing element 106 performs a Doppler FFT on the range data to detect differences in phase for a given range bin across the frame. The change in phase between two chirps represents a change in the position of the object during the time between the two chirps, and is thus indicative of a velocity of the object. For a change in phase, $\Delta\phi$, in a system using a radar of wavelength $\lambda$, a difference in the position of the object, $\Delta d$, can be determined as:

$$\Delta d = \frac{\lambda \Delta \phi}{4\pi} \qquad \text{Eq. 1}$$

In some environments, it is possible that multiple radar systems can operate in reasonably close proximity. For example, in applications in which the radar sensors are employed in vehicle safety systems, it is quite likely that multiple vehicles employing similar systems can be on a same road or in a same parking lot. As a result, signals sent by a transmitter associated with one radar system could be received at a radar sensor module associated with another radar system, causing potentially erroneous results. To avoid interference between systems, dither can be added to the interchirp timing in each frame when sending chirps from the transmitter 102. Accordingly, the interval between chirps varies according to a known pattern that is different across various radar systems.

Since the dither pattern is known, the signal processor 106 can compensate for the differences in interchirp timing in generating the range bin data. Unfortunately, the dither increases phase noise in the Doppler FFT, which can mask any weaker signals, representing other moving objects, in the Doppler FFT. To this end, the signal processor 106 can identify a strong signal return, representing a detected object, in the Doppler FFT data, that is, a signal return that exceeds the noise floor. A velocity of the detected object can be determined from the Doppler FFT, and a correction factor can be calculated from the determined velocity. This correction value can be applied to the range bin data and a second Doppler FFT can be performed on the corrected data to detect any signals that were below the noise floor in the first Doppler FFT.

Figure 2:
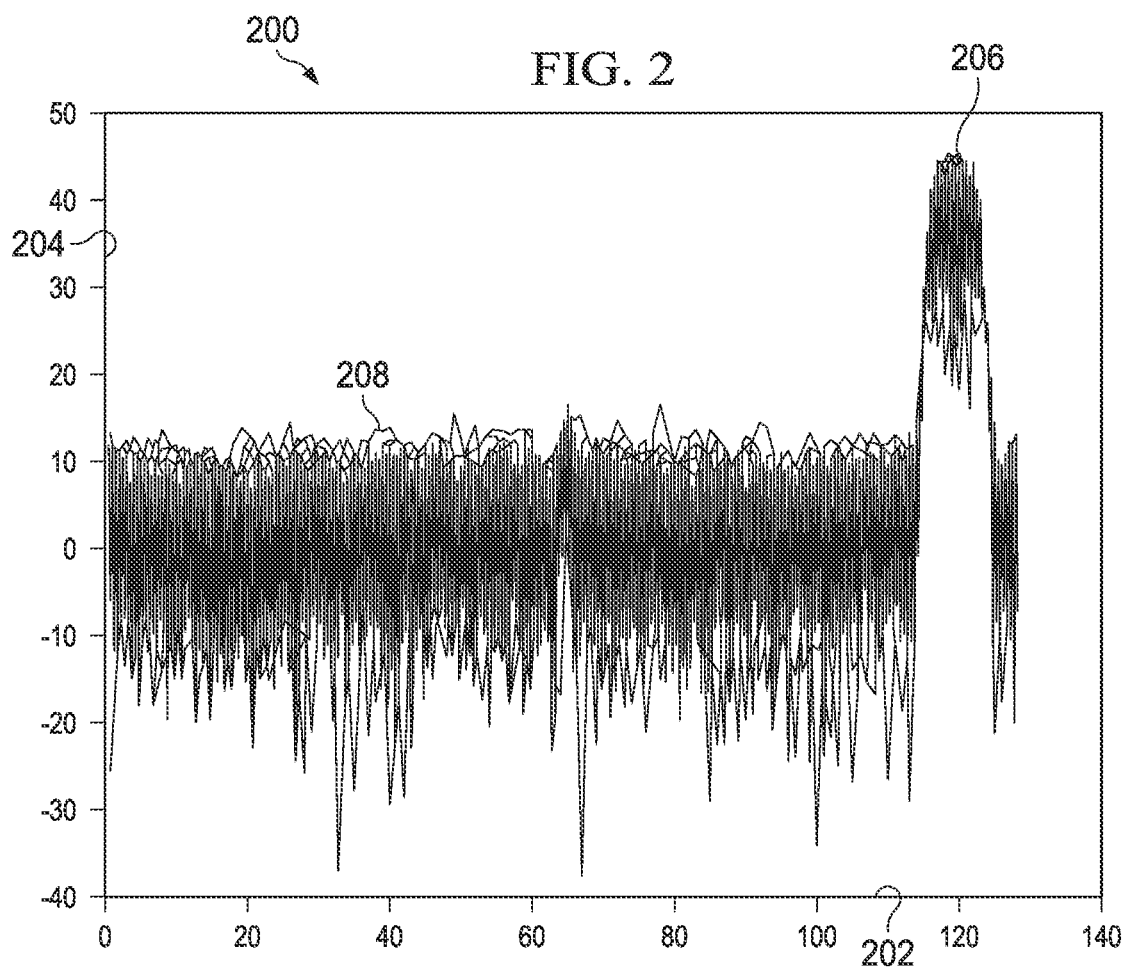
FIG. 2 is a graphical representation of a Doppler-FFT performed on range-gate data before correction for phase noise induced by a variable intrachrip interval.

FIG. 2 is a graphical representation 200 of a Doppler-FFT performed on range-gate data before correction for phase noise induced by a variable intrachrip interval. A horizontal axis 202 represents velocity as a set of velocity bins, and a vertical axis 204 represents signal amplitude in decibels. A given velocity bin, k, represents a velocity, v, in a system using a radar of wavelength $\lambda$ as $v = k\lambda/2NT_c$, where N is the total number of bins in the Doppler FFT and $T_c$ is the interchirp time interval. It will be appreciated that only one signal peak 206 is visible above a noise floor 208 of the Doppler-FFT, at approximately 120 m/s.

Figure 3:
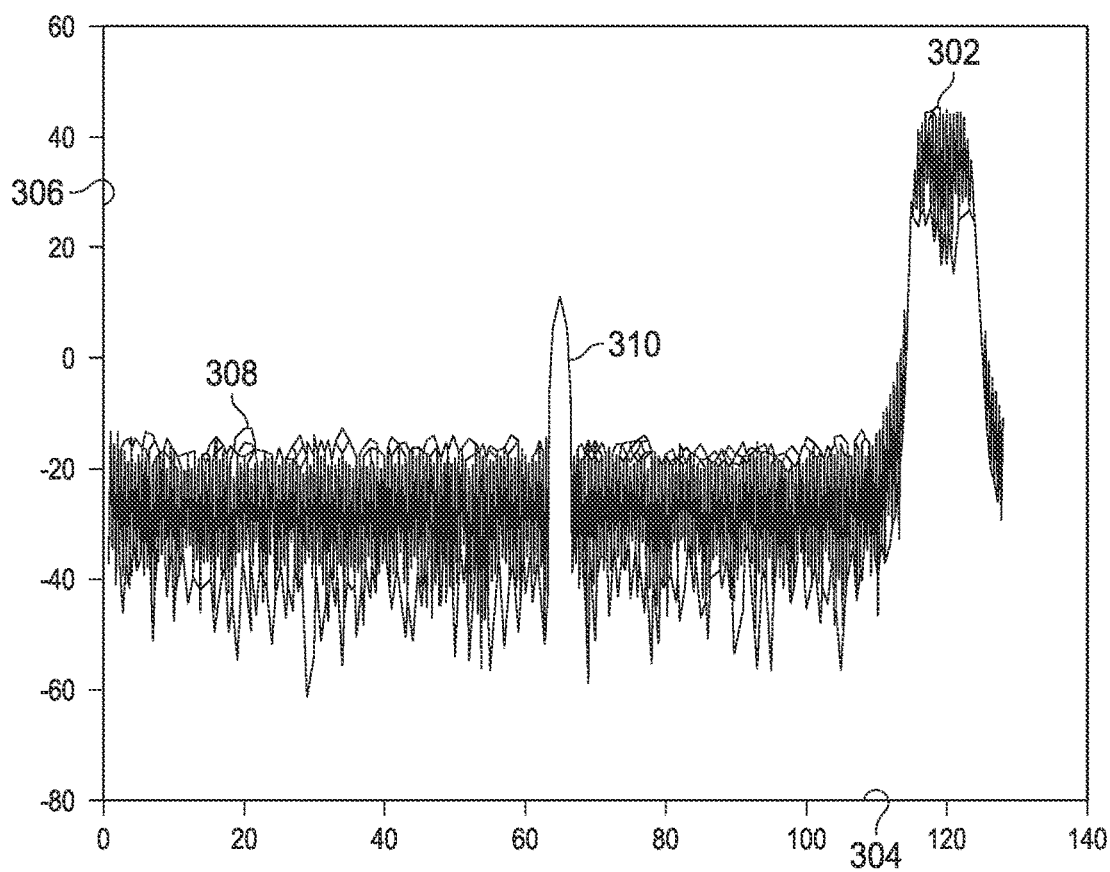
FIG. 3 is a graphical representation of a Doppler-FFT performed on the same range gate data as FIG. 2 after the range-gate data has been corrected for the phase noise caused by dither that is associated with the strongest signal peak.

FIG. 3 is a graphical representation 300 of a Doppler-FFT performed on the same range gate data as FIG. 2 after the range-gate data has been corrected for the phase noise caused by dither that is associated with the strongest signal peak 302. Specifically, a correction value calculated from the velocity associated with the strongest signal peak 302 was calculated and applied to the range-gate data. Once again, a horizontal axis 304 represents a velocity bin index, and a vertical axis 306 represents signal amplitude in decibels. After the correction, the noise floor 308 has been reduced by approximately twenty-five decibels relative to the noise floor 208 in FIG. 2, and a second peak 310, at around velocity bin index 60, is now visible. It will be appreciated that the second peak 310 represents an object that was masked by the noise floor prior to the correction, which could result in suboptimal output from a vehicle safety system or other application.

Figure 4:
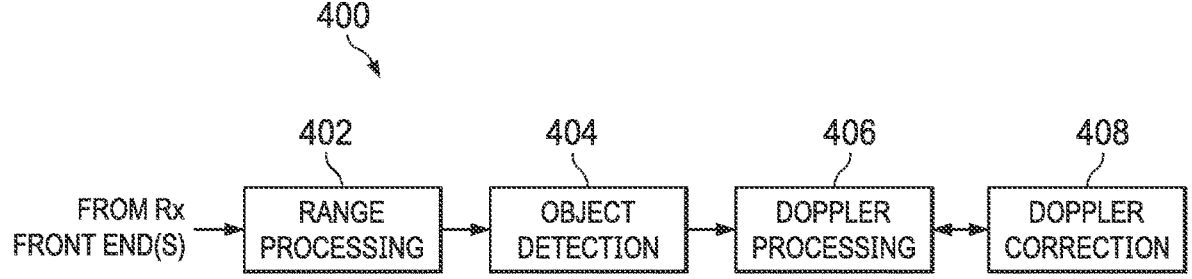
FIG. 4 illustrates one example of a signal processing component for processing frequency-modulated continuous wave (FMCW) radar signals.

FIG. 4 illustrates one example of a signal processing component 400 for processing frequency-modulated radar signals. For example, the signal processing component 400 can be used to provide the function of the signal processor 106 of FIG. 1. In the illustrated example, the signal processing component 400 receives a time series of intermediate frequency (IF) signal samples. An IF, or beat, signal between the transmitted chirp and the received signal from each chirp is generated at a mixer and sampled at an analog-to-digital converter (ADC) during the chirping time. The samples for each chirp are processed in a range processing block 402.

The range processing block 402 performs a Fast Fourier Transform (FFT) to provide, for each antenna, a set of values representing a strength of the reflected signal from each of a plurality of discrete ranges from the antenna. In one implementation, a windowing function can be applied to the input samples for the FFT prior to generating the FFT. A direct current (DC) component in the input signal samples can be estimated by averaging the samples in each chirp, and subtracted from each sample in the chirp. If the windowing function is used, any estimation and compensation for DC is applied after the windowing operation. In the illustrated implementation, the FFT for each chirp for each antenna is stored in a buffer as a set of range bin values. Given that there are multiple, $N_c$, chirps in each frame and a defined number of range bins, $N_r$, this provides a two-dimensional data structure with $N_r \times N_c$ entries.

The set of range-bin values is provided to an object detection component 404 that locates any objects within the region of interest. In one example, a one-dimensional constant false alarm rate (CFAR) algorithm can be used to detect objects at each range bin. In one implementation, an input for the CFAR algorithm is prepared by averaging the sample values, $x_{n,k,p}$, over all the chirps within a frame and all the virtual receive antennas such that a nth element, $s_n$, of a range profile vector, $s=[s_1, s_2, \ldots, s_{N_r}]$, is determined as:

$$s_n = \frac{1}{N_c N_a} \sum_{p=1}^{N_a} \sum_{k=1}^{N_c} |x_{n,k,p}|^2 \qquad \text{Eq. 2}$$

Once the range profile vector is determined, a one-dimensional CFAR algorithm can be performed on the range profile vector, s, to determine which range bins are likely to contain objects, referred to herein as "detected range bins". In a CFAR algorithm, values in the range profile vector that are peaks, that is, rise above the surrounding elements in the array (e.g., vector or matrix) as well as a background level, can be selected as detected range bins.

Once a set of detected range bins have been located, they are provided to a Doppler processing element 406 as a set of range-gate data. Specifically, range-gate data is provided to the Doppler processing element as sets of phasors representing phase differences between adjacent chirps in a radar frame for each detected range bin in the range FFT. The range-gate data for a given range-bin can be represented as:

$$x_i(n) = \sum_{i=1}^{m} A_i e^{-j(\omega_i(n)+\phi_i(n))} \qquad \text{Eq. 3}$$

where, $$\omega_i(n) = \frac{4\pi v_i T_C}{\lambda}$$

is an ideal phase difference the n−1$^{th}$ and the n$^{th}$ chirp in a frame for an i$^{th}$ target in the range bin, that is a phase difference for the target in the absence of phase noise induced by dither, $T_C$ is an interchirp interval before dither is applied, $$\phi_i(n) = \frac{4\pi v_i \Delta_n}{\lambda}$$

is the phase noise induced by the dither in the timing between the n−1$^{th}$ and the n$^{th}$ chirp in a frame for an i$^{th}$ target, $A_i$ is an amplitude of an i$^{th}$ target, m is a number of targets, $\Delta_n$ is the dither in the timing between the n−1$^{th}$ and the n$^{th}$ chirp in a frame and $\lambda$ is a wavelength associated with a carrier frequency of the transmitted chirp.

The Doppler processing element 406 performs a Doppler FFT on the range-gate data to produce a velocity for each of the targets. The Doppler FFT represents the targets in the region of interest as amplitudes of a signal return across velocity, and thus a velocity can be determined for each target above the noise floor. One or more velocity values, along with the range-gate data, can be provided to a Doppler correction element 408 that computes corrections value from the velocity value or values and applies it to the range-gate data to provide a corrected set of range gate data. Since the phase noise associated with a given target, $\phi_i(n)$, is a function of the velocity of the target, the correction value can simply be determined for each chirp as an multiplicative inverse of the expected phase noise for the identified velocity and multiplied with the original range gate value to provide the corrected phase gate data.

To provide a simplified example, assume that a given range bin includes two targets, such that the range-gate data for a given range bin can be represented as:

$$x(n) = A_1 e^{-j(\omega_1(n)+\phi_1(n))} + A_2 e^{-j(\omega_2(n)+\phi_2(n))} \qquad \text{Eq. 4}$$

Assuming that the amplitude associated with the first target is the larger of the two signal amplitudes, a set of correction values, CV, for the phase noise caused by the first target can be calculated from a velocity, $v_1$, associated with the first target and determined from the Doppler FFT as:

$$CV = e^{j\phi_1(n)} = e^{\frac{4\pi j v_1 \Delta_n}{\lambda}} \qquad \text{Eq. 5}$$

Each correction value represents a phasor rotation on the range-gate data. The correction value can be multiplied with the range-gate data for each chirp to provide corrected range gate values as:

$$x'(n) = A_1 e^{-j\omega_1(n)} + A_2 e^{-j(\omega_2(n)+\phi_2(n)-\phi_1(n))} \qquad \text{Eq. 6}$$

As seen in equation 6, the phase noise has been eliminated from the stronger target (first target with amplitude $A_1$), which is the dominant contributor to the noise floor. The Doppler processing element 406 can perform a Doppler FFT on the corrected range-gate data to provide a Doppler FFT with a reduced noise floor, such that a signal peak associated with the second target can be detected and used to determine a velocity for the second target.

In one implementation, the Doppler processing element 406 will only provide the range-gate data to the Doppler correction element 408 if one of the signal amplitudes is above a threshold value. The threshold value can be determined according to known weak target detection requirements of the radar system. Alternatively or additionally, the Doppler processing element 406 can provide the range-gate data to the Doppler correction element 408 iteratively to ensure that the phase noise for all targets having an amplitude above a threshold value is corrected and all weaker signals are detected than can practically be detected for a given radar sensor.

Figure 5:
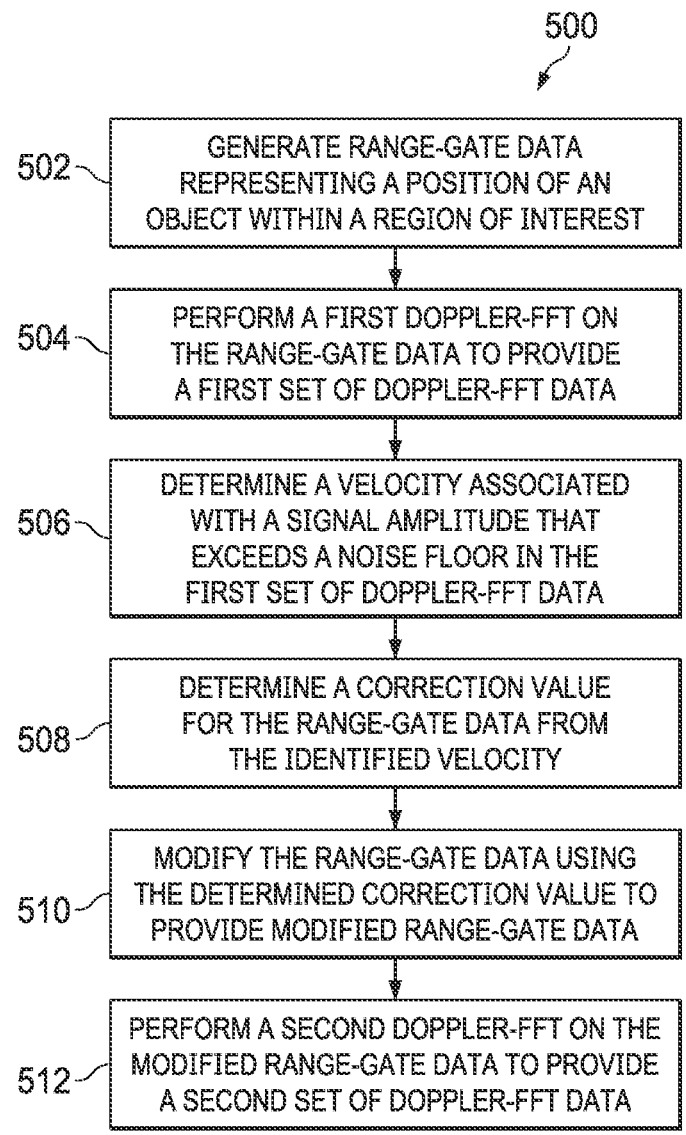
FIG. 5 illustrates one example of a method for detecting moving objects a region of interest.
Figure 6:
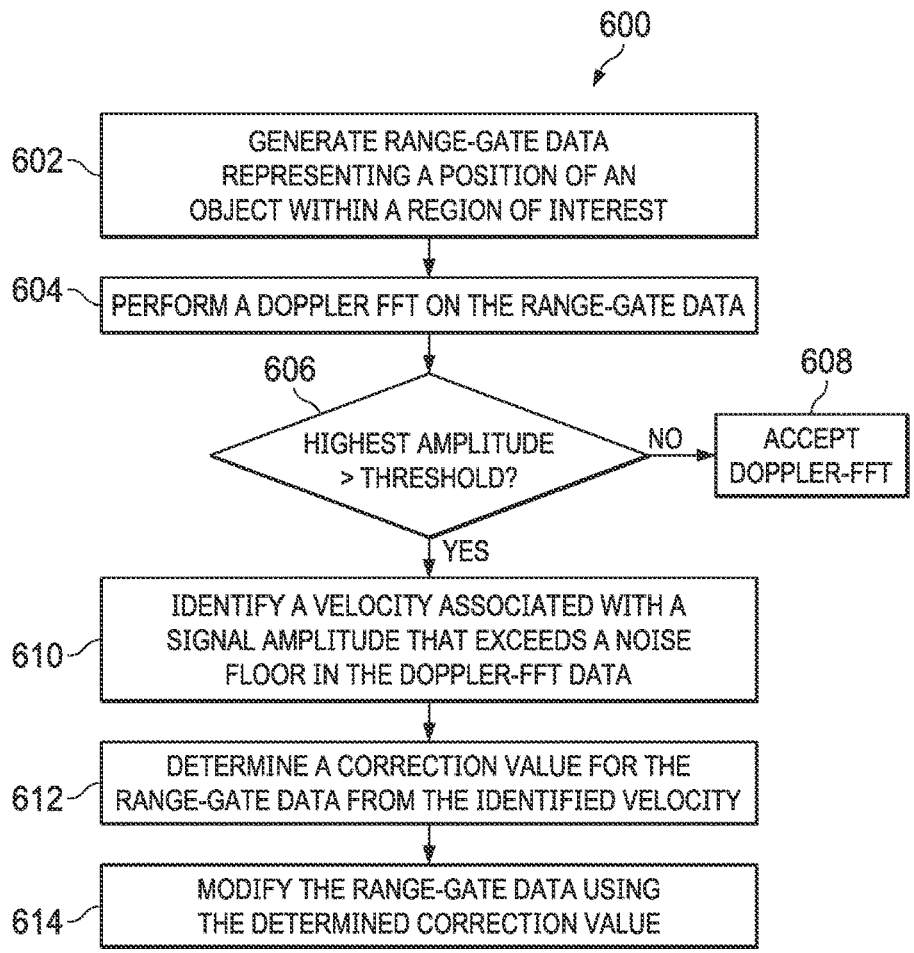
FIG. 6 illustrates another example of a method for detecting moving objects within a region of interest.

In view of the foregoing structural and functional features described above, example methods will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates one example of a method 500 for detecting objects within a region of interest. At 502, range-gate data representing the position of an object within a region of interest is generated at a radar sensor. In one example, the radar sensor is a frequency modulated continuous wave radar. At 504, a first Doppler-FFT is performed on the range-gate data to provide a first set of Doppler-FFT data. At 506, a velocity is determined from the first set of Doppler-FFT data. Specifically, the velocity is determined from a signal amplitude in the first set of Doppler-FFT data that exceeds a noise floor in the Doppler-FFT data. In practice, the strongest signals produce the largest amount of dither-induced phase noise, and thus the velocity associated with a highest signal amplitude can be selected.

At 508, a correction value for the range-gate data is determined from the identified velocity. The correction value is determined as to correct the range-gate data for phase noise caused by a variable interchirp interval, such as applied dither. In one example, a set of correction values, each associated with a chirp in a frame of radar returns, are determined as $$e^{\frac{4\pi j v_1 \Delta_n}{\lambda}},$$

where $v_1$ is the velocity associated with the signal amplitude that exceeds the noise floor, $\Delta_n$ is the dither in the timing between the $n-1^{th}$ and the $n^{th}$ chirp in the frame, and $\lambda$ is a wavelength associated with a carrier frequency of the transmitted chirp.

At 510, the range-gate data is modified using the determined correction value to provide modified range-gate data. In one example, a phase rotation is applied to the range-gate data based on the determined correction value. Once the data is corrected a second Doppler-FFT is performed on the modified range-gate data at 512 to provide a second set of Doppler-FFT data. In one implementation, the method 500 can be repeated to correct the modified range-gate data for additional strong peaks. For example, the method can be repeated until the amplitude associated with each peak in the Doppler-FFT data is below a threshold value. In another example, to save processing resources, the calculation and application of the correction value at 508, 510, and 512 are performed only if the highest signal amplitude in the first Doppler-FFT at 504 exceeds a threshold value.

FIG. 6 illustrates another example of a method 600 for detecting objects within a region of interest. At 602, range-gate data representing the position of an object within a region of interest is generated at a radar sensor, such as a frequency modulated continuous wave radar. At 604, a Doppler-FFT is performed on the range-gate data to provide a set of Doppler-FFT data. At 606, it is determined if a highest signal amplitude in the set of Doppler-FFT data exceeds a threshold value. Essentially, the comparison at 606 determines if there is a signal of sufficient strength to mask other, weaker signals with its phase noise skirt, and the threshold can be selected according to weak target detection requirements of the radar sensor. If the highest signal amplitude in the Doppler-FFT data does not exceed the threshold (N), the Doppler-FFT data is accepted at 608.

If the highest signal amplitude in the Doppler-FFT data exceeds the threshold (Y), the method proceeds to 610, where a velocity is determined from a signal amplitude in the set of Doppler-FFT data that exceeds a noise floor. At 612, a correction value for the range-gate data is determined from the identified velocity. The correction value is determined as to correct the range-gate data for phase noise caused by a variable interchirp interval, such as applied dither. In one example, a set of correction values, each associated with a chirp in a frame of radar returns, are determined as $$e^{\frac{4\pi j v_1 \Delta_n}{\lambda}},$$

where $v_1$ is the velocity associated with the signal amplitude that exceeds the noise floor, $\Delta_n$ is the dither in the timing between the $n-1^{th}$ and the $n^{th}$ chirp in the frame and $\lambda$ is a wavelength associated with a carrier frequency of the transmitted chirp. At 614, the range-gate data is modified using the determined correction value. In one example, a phase rotation is applied to the range-gate data based on the determined correction value. The method then returns to 604 to perform a Doppler-FFT on the modified range-gate data.

Figure 7:
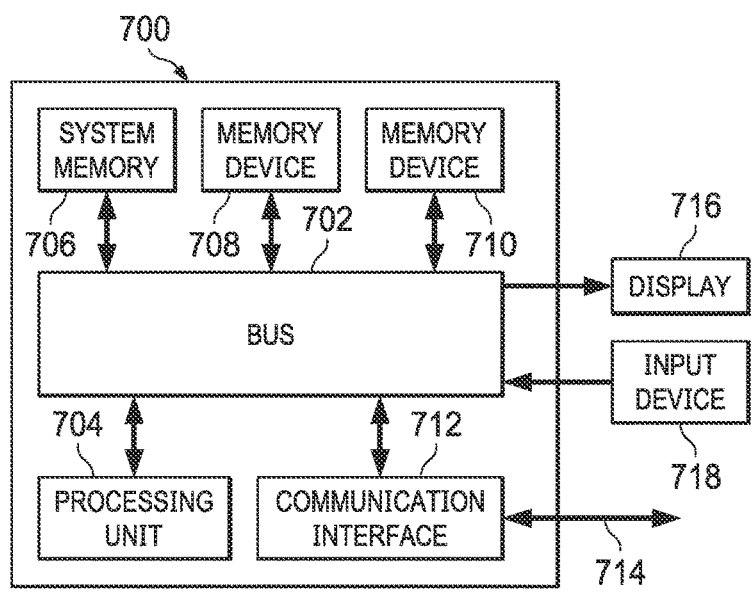
FIG. 7 is a schematic block diagram illustrating an exemplary system of hardware components capable of implementing examples of the systems and methods disclosed in FIGS. 1-6, such as the digital signal processor illustrated in FIG. 4.

FIG. 7 is a schematic block diagram illustrating an exemplary system 700 of hardware components capable of implementing examples of the systems and methods disclosed in FIGS. 1-6, such as the digital signal processor 400 illustrated in FIG. 4. The system 700 can include various systems and subsystems. The system 700 can be a personal computer, a laptop computer, a workstation, a computer system, an appliance, an application-specific integrated circuit (ASIC), a server, a server blade center, a server farm, etc. In one implementation, the system 700 is a microprocessor, and it will be appreciated that in this implementation, some of the components 702, 704, 706, 708, 710, 712, 714, 716, and 718 may not be necessary. In one example, the digital signal processor 400 can be implemented as an integrated circuit. Examples of integrated circuit hardware that could be adapted for this purpose can be found in TI datasheet SWRS203A, available at http://www.ti.com/general/docs/datasheetdiagram.tsp?genericPartNumber=AWR1642&diagramId=SWRS203A, and TI datasheet SWRS202A, available at http://www.ti.com/general/docs/datasheetdiagram.tsp?genericPartNumber=AWR1443&diagramId=SWRS202A, each of which are hereby incorporated by reference.

The system 700 can includes a system bus 702, a processing unit 704, a system memory 706, memory devices 708 and 710, a communication interface 712 (e.g., a network interface), a communication link 714, a display 716 (e.g., a video screen), and an input device 718 (e.g., a keyboard and/or a mouse). The system bus 702 can be in communication with the processing unit 704 and the system memory 706. The additional memory devices 708 and 710, such as a hard disk drive, server, stand-alone database, or other non-volatile memory, can also be in communication with the system bus 702. The system bus 702 interconnects the processing unit 704, the memory devices 706-710, the communication interface 712, the display 716, and the input device 718. In some examples, the system bus 702 also interconnects an additional port (not shown), such as a universal serial bus (USB) port.

The processing unit 704 can be a computing device and can include an application-specific integrated circuit (ASIC). The processing unit 704 executes a set of instructions to implement the operations of examples disclosed herein. The processing unit can include a processing core.

The additional memory devices 706, 708, and 710 can store data, programs, instructions, database queries in text or compiled form, and any other information that can be needed to operate a computer. The memories 706, 708 and 710 can be implemented as computer-readable media (integrated or removable) such as a memory card, disk drive, compact disk (CD), or server accessible over a network. In certain examples, the memories 706, 708 and 710 can comprise text, images, video, and/or audio, portions of which can be available in formats comprehensible to human beings. Additionally or alternatively, the system 700 can access an external data source or query source through the communication interface 712, which can communicate with the system bus 702 and the communication link 714.

In operation, the system 700 can be used to implement one or more parts of a system in accordance with the present invention. Computer executable logic for implementing the system resides on one or more of the system memory 706, and the memory devices 708, 710 in accordance with certain examples. The processing unit 704 executes one or more computer executable instructions originating from the system memory 706 and the memory devices 708 and 710. The term "computer readable medium" as used herein refers to any medium that participates in providing instructions to the processing unit 704 for execution, and it will be appreciated that a computer readable medium can include multiple computer readable media each operatively connected to the processing unit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system comprising:
a radar sensor module configured to generate range-gate data representing the position of an object within a region of interest; and
a signal processor configured to perform a Doppler Fast Fourier Transform (Doppler-FFT) on the range-gate data to provide Doppler-FFT data, identify a velocity associated with a signal amplitude in the Doppler-FFT that exceeds a noise floor with respect to the Doppler-FFT data, estimate a phase noise component associated with the signal amplitude, determine a correction value for the range-gate data from the estimated phase noise component, and modify the range-gate data using the determined correction value to provide modified range-gate data.

2. The system of claim 1, the signal processor comprising:
a Doppler processing element configured to perform the Doppler-FFT; and
a Doppler correction element configured to estimate the phase noise component, determine the correction value and modify the range-gate data using the determined correction value.

3. The system of claim 2, wherein the Doppler correction element is configured to estimate the phase noise component, determine the correction value and modify the range-gate data using the determined correction value only when the signal amplitude that exceeds the noise floor also exceeds a threshold value.

4. The system of claim 2, wherein the modified range-gate data is a first set of modified range-gate data, the Doppler-FFT is a first Doppler-FFT, the Doppler-FFT data is a first set of Doppler-FFT data, and the Doppler processing element is further configured to perform a second Doppler-FFT on the first set of modified range-gate data, determines if a signal amplitude in the second Doppler-FFT data exceeds a threshold value, and provide a velocity associated with the signal amplitude in the second Doppler-FFT that exceeds the threshold value to the Doppler correction element to generate a second set of modified range-gate data when the signal amplitude in the second Doppler-FFT data exceeds the threshold value.

5. The system of claim 4, wherein the threshold value is determined according to weak target detection requirements of the radar sensor module.

6. A method comprising:
generating, by a radar sensor, range-gate data representing the position of an object within a region of interest;
performing a first Doppler Fast Fourier Transform (Doppler-FFT) on the range-gate data to provide a first set of Doppler-FFT data, the first set of Doppler-FFT data;
identifying a first velocity associated with a first signal amplitude that exceeds a first noise floor with respect to the first set of Doppler-FFT data;
determining a first correction value for the range-gate data from the identified first velocity;
modifying the range-gate data using the determined first correction value to provide a first set of modified range-gate data;
performing a second Doppler-FFT on the first set of modified range-gate data to provide a second set of Doppler-FFT data;

identifying a second velocity associated with a second signal amplitude that exceeds second noise floor with respect to the second set of Doppler-FFT data;

determining a second correction value for the first set of modified range-gate data from the identified second velocity;

modifying the first set of modified range-gate data using the determined second correction value to provide a second set of modified range-gate data; and applying a third Doppler-FFT to the second set of modified range-gate data to provide a third set of Doppler-FFT data.

7. The method of claim 6, wherein modifying the range-gate data using the determined first correction value to provide the first set of modified range-gate data comprises applying a phase rotation to the range-gate data based on the determined first correction value.

8. The method of claim 7, wherein determining a correction value comprises determining a set of correction values, each associated with a return signal of a chirp in a frame of chirps, as $$e^{\frac{4\pi j v_1 \Delta_n}{\lambda}},$$

where $v_1$ is the velocity associated with the signal amplitude that exceeds the noise floor, $\Delta_n$ is the dither in the timing between the $n-1^{th}$ and the $n^{th}$ chirp in the frame, and $\lambda$ is a wavelength associated with a carrier frequency of the transmitted chirp.

9. The method of claim 6, further comprising determining, when the second signal amplitude exceeds a threshold value, the threshold value being independent of each of the first and the second noise floor, wherein determining the second correction value comprises determining the second correction value for the first set of modified range-gate data only when the second signal amplitude exceeds the threshold value.

10. The method of claim 6, further comprising determining, when the first signal amplitude exceeds a threshold value, the threshold value being independent of each of the first and second noise floor, wherein determining the first correction value comprises determining the first correction value for the modified range-gate data only when the first signal amplitude exceeds the threshold value.

11. The method of claim 10, wherein the threshold value is determined according to weak target detection requirements of the radar sensor.

12. The method of claim 6, wherein generating range-gate data representing the position of an object within a region of interest comprises providing a series of frequency modulated chirps with a variable interchirp interval, wherein modifying the range-gate data using the determined correction value comprises modifying the range-gate data to remove phase noise caused by the variable interchirp interval.

13. A system comprising:

a radar sensor module configured to generate range-gate data representing the position of an object within a region of interest; and a signal processor configured to perform a Doppler Fast Fourier Transform (Doppler-FFT) on the range-gate data to provide Doppler-FFT data identify a velocity associated with a signal amplitude in the Doppler-FFT that exceeds a noise floor with respect to the Doppler-FFT data, determine a set of correction values, each associated with a return signal of a chirp in a frame of chirps, as $$e^{\frac{4\pi j v_1 \Delta_n}{\lambda}},$$

where $v_1$ is the velocity associated with the signal amplitude that exceeds the noise floor, $\Delta_n$ is the dither in the timing between the $n-1^{th}$ and the $n^{th}$ chirp in the frame, and $\lambda$ is a wavelength associated with a carrier frequency of the transmitted chirp, and modify the range-gate data by applying phase rotations to the range-gate data based on the determined set of correction values to provide modified range-gate data.

14. The system of claim 13, the signal processor comprising:

a Doppler processing element configured to perform the Doppler-FFT; and a Doppler correction element configured to perform the set of correction values and modify the range-gate data using the determined set of correction values.

15. The system of claim 14, wherein the Doppler correction element is further configured to determine the set of correction values and modify the range-gate data using the determined set of correction values only when the signal amplitude that exceeds the noise floor also exceeds a threshold value.

16. The system of claim 14, wherein the modified range-gate data is a first set of modified range-gate data, the Doppler-FFT is a first Doppler-FFT, the Doppler-FFT data is a first set of Doppler-FFT data, and the Doppler processing element is further configured to perform a second Doppler-FFT on the first set of modified range-gate data, determines if a signal amplitude in the second Doppler-FFT data exceeds a threshold value, and provide a velocity associated with the signal amplitude in the second Doppler-FFT that exceeds the threshold value to the Doppler correction element to generate a second set of modified range-gate data when the signal amplitude in the second Doppler-FFT data exceeds the threshold value.

17. The system of claim 16, wherein the threshold value is determined according to weak target detection requirements of the radar sensor module.

* * * * *